United States Patent
Wakabayashi et al.

(10) Patent No.: US 11,372,237 B2
(45) Date of Patent: Jun. 28, 2022

(54) OPTICAL DEVICE AND PROJECTOR

(71) Applicant: SEIKO EPSON CORPORATION, Tokyo (JP)

(72) Inventors: Shinichi Wakabayashi, Suwa (JP); Masatoshi Ito, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/204,553

(22) Filed: Mar. 17, 2021

(65) Prior Publication Data

US 2021/0294094 A1    Sep. 23, 2021

(30) Foreign Application Priority Data

Mar. 18, 2020    (JP) .............................. JP2020-047312

(51) Int. Cl.
*H04N 9/31* (2006.01)
*G03B 21/14* (2006.01)
*G02B 26/08* (2006.01)

(52) U.S. Cl.
CPC ....... *G02B 26/0875* (2013.01); *G03B 21/147* (2013.01)

(58) Field of Classification Search
CPC ............................ H04N 9/3188; G03B 21/142
See application file for complete search history.

(56) References Cited

U.S. PATENT DOCUMENTS

| 5,604,638 A | * | 2/1997 | Nomura | ................... G02B 7/10 |
| | | | | 359/823 |
| 2016/0124217 A1 | | 5/2016 | Kojima et al. | |
| 2018/0095269 A1 | | 4/2018 | Mizoguchi et al. | |

FOREIGN PATENT DOCUMENTS

| JP | 2016-90751 A | 5/2016 |
| JP | 2018-54974 A | 4/2018 |

* cited by examiner

*Primary Examiner* — Ryan D Howard
(74) *Attorney, Agent, or Firm* — Oliff PLC

(57) ABSTRACT

A projector includes a light outputting apparatus that outputs video light, a projection system that enlarges and projects the video light, and an optical device disposed between the light outputting apparatus and the projection system. The optical device includes a movable section including a glass plate (optical section) having a light incident surface on which the video light is incident, a shaft section that swingably supports the movable section around a first swing axis, and an actuator that causes the movable section to swing. The cross-sectional shape of the shaft section viewed in the direction along the first swing axis is a shape having a plurality of recesses recessed inward.

15 Claims, 7 Drawing Sheets

OPTICAL DEVICE AND PROJECTOR

The present application is based on, and claims priority from JP Application Serial Number 2020-047312, filed Mar. 18, 2020, the disclosure of which is hereby incorporated by reference herein in its entirety.

BACKGROUND

1. Technical Field

The present disclosure relates to an optical device including a movable section and to a projector.

2. Related Art

JP-A-2018-54974 discloses an image display apparatus including an optical device that shifts the optical path of video light outputted from a light modulator, such as a liquid crystal panel. The image display apparatus disclosed in JP-A-2018-54974 uses the optical device to make the resolution of a projected image higher than the resolution of the light modulator. The optical device includes a movable section including a glass plate that is an optical section on which light is incident, a frame-shaped support section that surrounds the movable section, and an actuator. The movable section and the support section are connected to each other via a shaft section. The actuator causes the movable section to swing around the shaft section to change the attitude of the glass plate. The optical path of the video light incident on the glass plate is thus shifted.

In the optical device, in which the movable section is connected to the support section via the shaft section, torsional stress is induced in the shaft section when the movable section swings, so that the cross-sectional shape of the shaft section affects the vibrational characteristics of the movable section. For example, thickening the shaft section to ensure the rigidity thereof results in insufficient torque for rotating the movable section. Large flection of the shaft section causes an instable action of the movable section, resulting in a decrease in the quality of video images. It is therefore desirable to optimize the shape of the shaft section.

SUMMARY

An optical device according to an aspect of the present disclosure includes a movable section including an optical section having a light incident surface, a shaft section that swingably supports the movable section around a swing axis, and an actuator that causes the movable section to swing, and a cross-sectional shape of the shaft section viewed in a direction along the swing axis is a shape having a plurality of recesses recessed inward.

An optical device according to another aspect of the present disclosure includes a movable section including an optical section having a light incident surface, a first shaft section and a second shaft section that swingably support the movable section around a swing axis, and an actuator that causes the movable section to swing. A cross-sectional shape of the first shaft section viewed in a direction along the swing axis is a first cross-sectional shape, and a cross-sectional shape of the second shaft section viewed in the direction along the swing axis is a second cross-sectional shape. The first cross-sectional shape differs from the second cross-sectional shape, and the first cross-sectional shape and the second cross-sectional shape are each a shape having a plurality of recesses recessed inward.

A projector according to another aspect of the present disclosure includes a light outputting apparatus that outputs video light, a projection system that enlarges and projects the video light, and the optical device described above disposed between the light outputting apparatus and the projection system.

DESCRIPTION OF EXEMPLARY EMBODIMENTS

An exemplary embodiment according to the present disclosure will be described below with reference to the drawings. In the present specification, axes X, Y, and Z are shown as three axes perpendicular to one another with one side of the axis-X direction corresponding to a direction +X and the other side of the axis-X direction corresponding to a direction −X for convenience of description. Similarly, one side of the axis-Y direction corresponds to a direction +Y and the other side of the axis-Y direction corresponds to a direction −Y, and one side of the axis-Z direction corresponds to a direction +Z and the other side of the axis-Z direction corresponds to a direction −Z.

Projector

Figure 1:
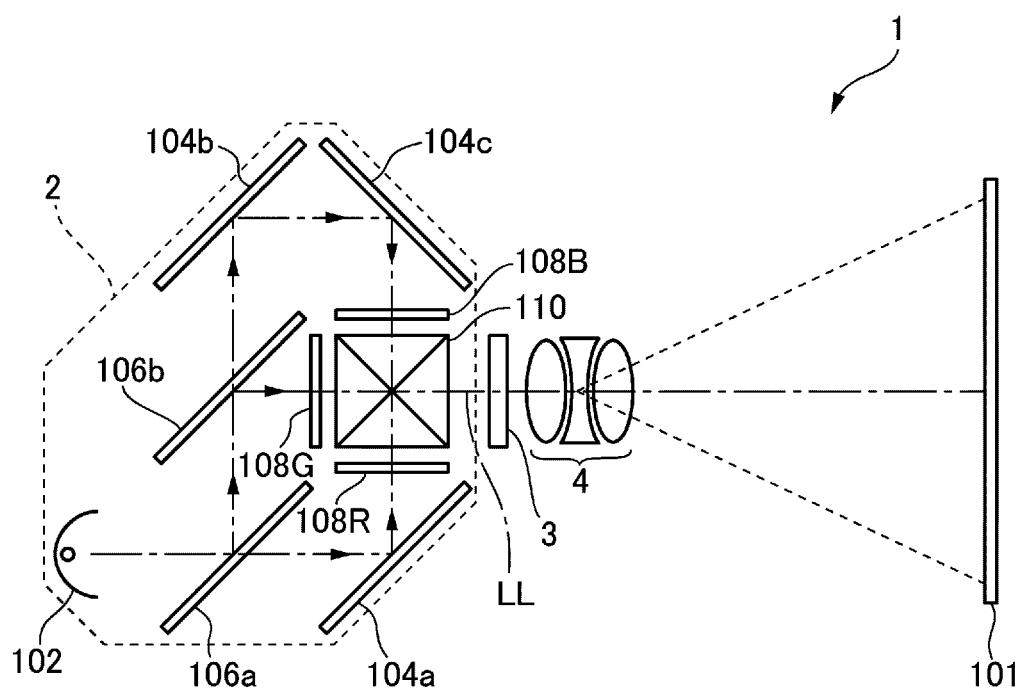
FIG. 1 is a descriptive diagram showing an optical configuration of a projector according to an embodiment of the present disclosure.

FIG. 1 is a descriptive diagram showing an optical configuration of a projector 1 according to the present embodiment. The projector 1 displays video images on a screen 101 based on an externally inputted video signal. The projector 1 includes a light outputting apparatus 2, an optical device 3, and a projection system 4. The axis-Z direction coincides with an optical axis L of video light LL outputted from the light outputting apparatus 2, as shown in FIG. 1. The direction +Z is the direction in which the vide light LL is outputted.

The light outputting apparatus 2 includes a light source 102, mirrors 104a, 104b, and 104c, dichroic mirrors 106a and 106b, light modulators 108R, 108G, and 108B, and a dichroic prism 110.

The light source 102 is, for example, a halogen lamp, a mercury lamp, a light emitting diode (LED), or a laser light source. A light source that outputs white light is used as the light source 102. The light outputted from the light source 102 is separated by the dichroic mirror 106a, for example, into red light and other light. The red light is reflected off the mirror 104a and is incident on the light modulator 108R, and the other light is further separated by the dichroic mirror 106b into green light and blue light. The green light is incident on the light modulator 108G, and the blue light is incident on the light modulator 108B after reflected off the mirrors 104b and 104c.

The light modulators 108R, 108G, and 108B each modulate light incident thereon in accordance with an image signal. The light modulators 108R, 108G, and 108B each include a transmissive liquid crystal panel. The red light modulated by the light modulator 108R, the green light modulated by the light modulator 108G, and the blue light modulated by the light modulator 108B are combined with one another by the dichroic prism 110, and full-color video light LL exits out of the dichroic prism 110. The thus exiting video light LL is enlarged and projected by the projection system 4 on the screen 101.

The light outputting apparatus 2 does not necessarily have the configuration described above and may instead have any configuration that can generate and output the video light LL. For example, the light modulators may include be reflective liquid crystal panels or digital micromirror devices (DMDs).

The optical device 3 is disposed between the dichroic prism 110 and the projection system 4. In the projector 1, the optical device 3 shifts the optical path of the video light LL (performs what is called "pixel shift") to display an image having resolution higher than the resolution of the light modulators on the screen 101. For example, when the light modulators are full-high-vision light modulators, a 4 k-image can be displayed.

Figure 2:
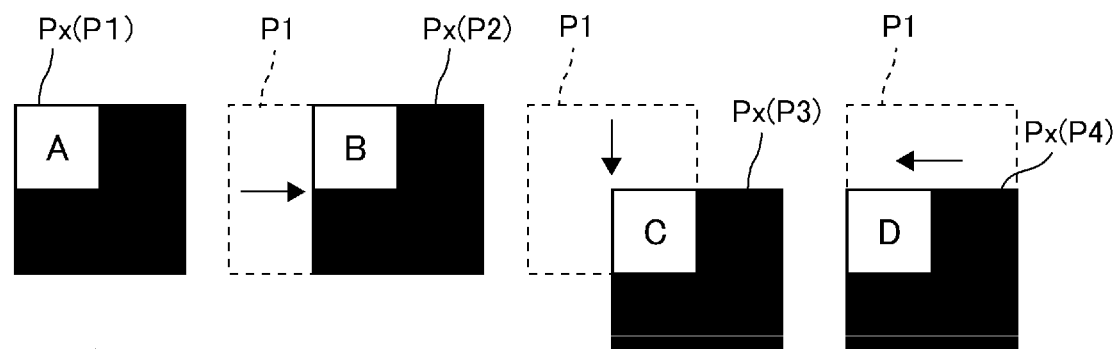
FIG. 2 is a descriptive diagram showing that an image display position is shifted by pixel shift.
Figure 2:

A principle for an increase in resolution achieved by the shift of the optical path of the video light will next be briefly described with reference to FIG. 2. FIG. 2 is a descriptive diagram showing that an image display position is shifted by shifting the optical path of the video light. As will be described later, the optical device 3 includes a glass plate 30 (see FIG. 3), which is a plate-shaped optical section on which the video light LL, which is the combination of the light fluxes modulated by the light modulators 108R, 108G, and 108B, is incident, and the optical device 3 changes the attitude of the glass plate 30 to shift the optical path of the video light LL by using refraction.

The optical device 3 causes the glass plate 30 to swing in two directions, a first swing direction around a first swing axis J1, which intersects the optical axis L, and a second swing direction around a second swing axis J2, which intersects the optical axis L and the first swing axis J1. When the glass plate 30 swings in the first swing direction, the optical path of the light incident on the glass plate 30 is shifted in a first direction F1. When the glass plate 30 swings in the second swing direction, the optical path of the light incident on the glass plate 30 is shifted in a second direction F2, which intersects the first direction F1. A pixel Px to be displayed on the screen 101 is therefore shifted in the first direction F1 and the second direction F2, which intersects the first direction F1, and then displayed on the screen 101.

The projector 1 combines the shift of the optical path in the first direction F1 with the shift of the optical path in the second direction F2 to increase the number of apparent pixels to increase the resolution of an image displayed on the screen 101. For example, the pixel Px is moved to positions shifted by half a pixel (that is, half of each pixel Px) in the first direction F1 and the second direction F2, as shown in FIG. 2. The image display position on the screen 101 can therefore be shifted to an image display position P2, which is shifted by half a pixel from a image display position P1 in the first direction F1, an image display position P3, which is shifted by half a pixel from the image display position P1 in the first direction F1 and the second direction F2, and an image display position P4, which is shifted by half a pixel from the image display position in the second display F1.

The optical path shift operation is so performed that an image is displayed for a fixed period in each of the image display positions P1, P2, P3, and P4 to change the content displayed on the liquid crystal panels in synchronization with the optical path shift operation. Pixels A, B, C, and D each having a size apparently smaller than the pixel Px can therefore be displayed. For example, to display the pixels A, B, C, and D as a whole at a frequency of 60 Hz, the liquid crystal panels each need to display images at a speed four times faster so as to correspond to the image display positions P1, P2, P3 and P4. That is, the display frequency or what is called a refreshing rate of the liquid crystal panels is 240 Hz.

Optical Device

Figure 3:
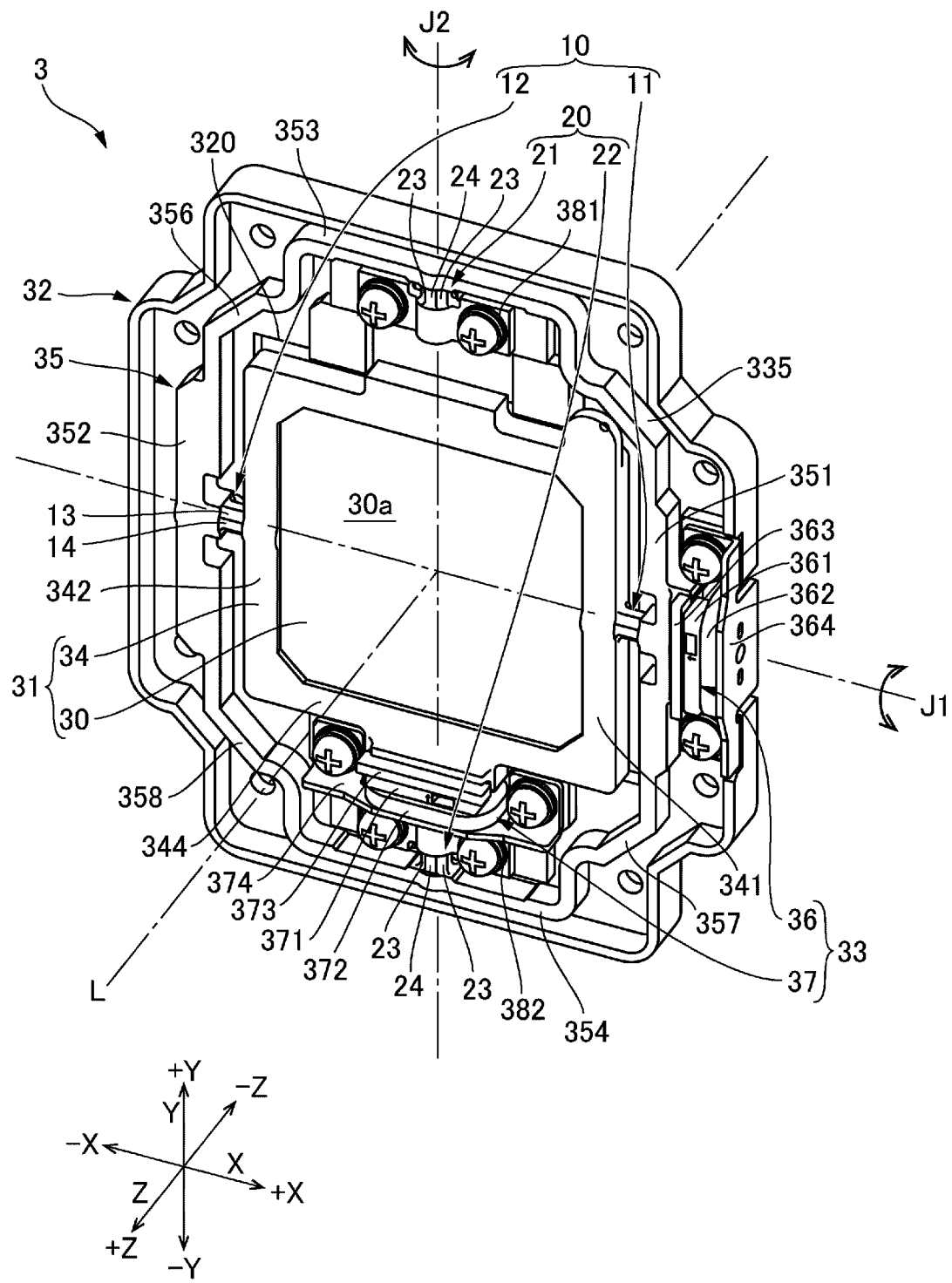
FIG. 3 is a perspective view of an optical device according to the present embodiment.

FIG. 3 is a perspective view of the optical device 3 according to the present embodiment. The optical device 3 includes a movable section 31, which includes the glass plate 30 having a rectangular shape, a fixed section 32, which swingably supports the movable section 31, and an actuator 33, which causes the movable section 31 to swing around the first swing axis J1 and the second swing axis J2. The first swing axis J1 coincides with the axis-X direction, and the second swing axis J2 coincides with the axis-Y direction. The optical device 3 uses the glass plate 30 as an optical section having a light incident surface 30a, on which the video light LL is incident. It is, however, noted that the optical section only needs to be made of a material that transmits light and refracts the video light LL. In the present embodiment, a surface of the optical section that is the surface facing the +Z-axis side is the light incident surface 30a, but not necessarily, and the side opposite the light incident surface 30a, that is, the −Z-axis side of the optical section in the present embodiment may be the light incident surface.

The movable section 31 includes the glass plate 30 and a rectangular inner frame 34, which holds the glass plate 30. The inner frame 34 is connected to an outer frame 35 via a shaft section 10 disposed along the first swing axis J1. The shaft section 10 swingably supports the movable section 31 around the first swing axis J1. The shaft section 10 includes a first shaft section 11 disposed on a side of the movable section 31 that is the side in the direction +X and a second shaft section 12 disposed on a side of the movable section 31 that is the side in the direction −X. The movable section 31 is connected to the outer frame 35 via the first shaft section 11 and the second shaft section 12.

The outer frame 35 is a frame-shaped member that surrounds the inner frame 34. The outer frame 35 is connected to the fixed section 32 via a shaft section 20 disposed along the second swing axis J2. The shaft section 20 swingably supports the movable section 31 and the outer frame 35 around the second swing axis J2. The shaft section 20 is formed of a third shaft section 21 disposed on a side of the movable section 31 that is the side in the direction +Y and a fourth shaft section 22 disposed on a side of the movable section 31 that is the side in the direction −Y. The outer frame 35 is connected to the fixed section 32 via the third shaft section 21 and the fourth shaft section 22. The movable section 31 is therefore supported by the fixed section 32 via the first shaft section 11 and the second shaft section 12, the outer frame 35, and the third shaft section 21 and the fourth shaft section 22.

The fixed section 32 is a plate-shaped member having a rectangular opening 320, in which the inner frame 34 is disposed. The third shaft section 21 is connected to an edge of the opening 320 that is the edge in the direction +Y, and the fourth shaft section 22 is connected to an edge of the opening 320 that is the edge in the direction −Y. The fixed section 32 swingably supports the movable section 31 around the first swing axis J1 via the first shaft section 11 and the second shaft section 12. The fixed section 32 further swingably supports the movable section 31 around the second swing axis J2 via the third shaft section 21 and the fourth shaft section 22.

The actuator 33 includes a first actuator 36, which causes the movable section 31 to swing around the second swing axis J2, and a second actuator 37, which causes the movable section 31 and the outer frame 35 to swing around the first swing axis J1. The first actuator 36 is a magnetically driven mechanism including a magnet 361 and a coil 362 facing each other in the axis-Y direction. The magnet 361 is fixed to the inner frame 34 via a magnet holding plate 363, and the coil 362 is fixed to the fixed section 32 via a coil holding plate 364. The second actuator 37 is a magnetically driven mechanism including a magnet 371 and a coil 372 facing each other in the axis-X direction. The magnet 371 is fixed to the outer frame 35 via a magnet holding plate 373, and the coil 372 is fixed to the fixed section 32 via a coil holding plate 374.

Figure 4:
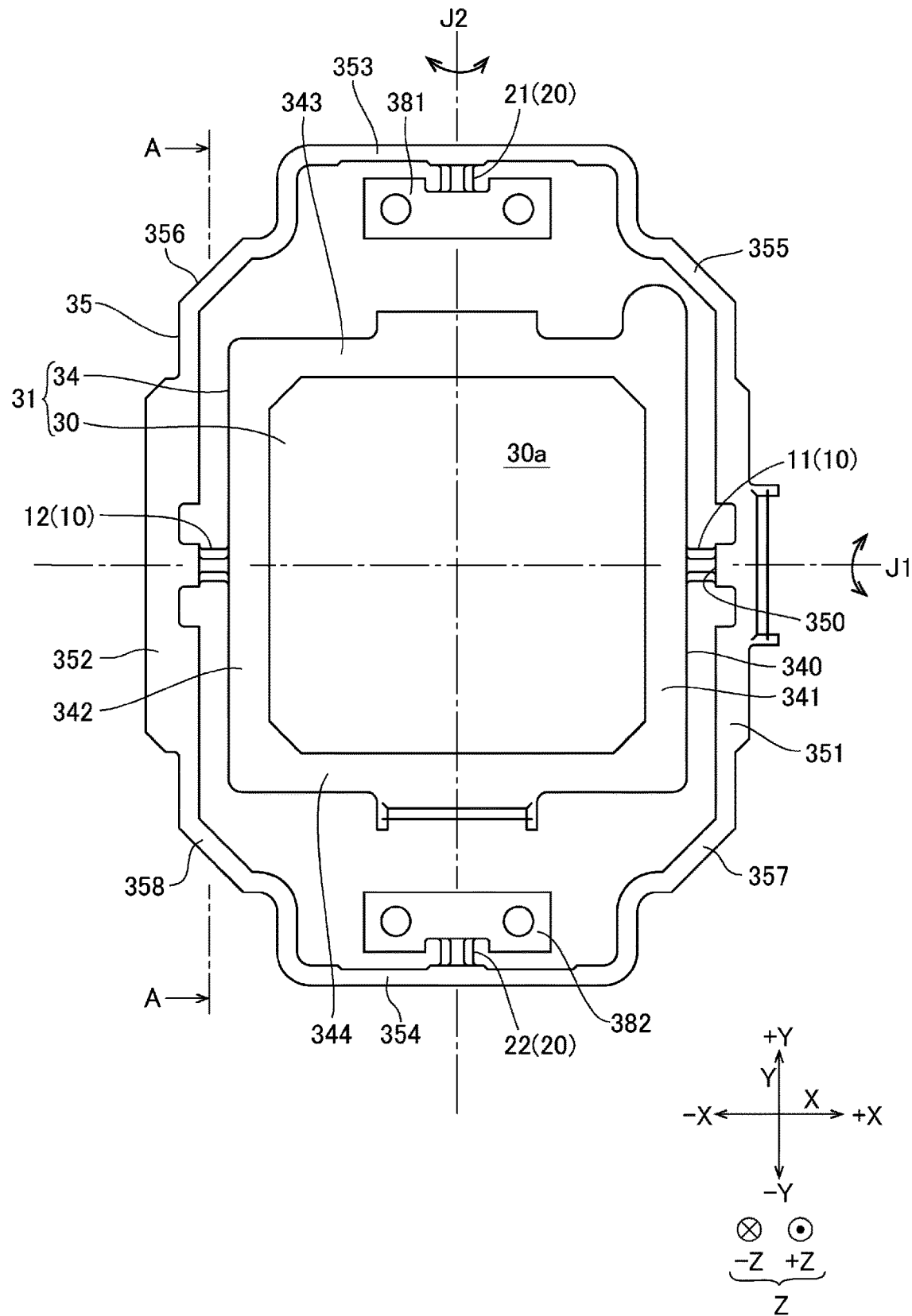
FIG. 4 is a plane view of a movable section, shaft sections, and an outer frame.

FIG. 4 is a plane view of the movable section 31, the shaft sections 10 and 20, and the outer frame 35. The inner frame 34 includes a first frame section 341 and t a second frame section 342, which extend substantially in parallel to the axis-Y direction, a third frame section 343, which extends in the axis-X direction and connects ends of the first frame section 341 and the second frame section 342 that are the ends in the direction +Y to each other, and a fourth frame section 344, which extends in the axis-X direction and connects ends of the first frame section 341 and the second frame section 342 that are the ends in the direction −Y to each other, as shown in FIGS. 3 and 4. The first frame section 341 holds an edge of the glass plate 30 that is the edge in the direction +X. The second frame section 342 holds an edge of the glass plate 30 that is the edge in the direction −X. The third frame section 343 holds an edge of the glass plate 30 that is the edge in the direction +Y. The fourth frame section 344 holds an edge of the glass plate 30 that is the edge in the direction −Y.

The outer frame 35 has a substantially octagonal shape. The outer frame 35 includes a first frame section 351 and a second frame section 352, which extend substantially in parallel to the axis-Y direction, a third frame section 353 and a fourth frame section 354, which extend substantially in parallel to the axis-X direction, a fifth frame section 355, which connects the first frame section 351 to the third frame section 353, a sixth frame section 356, which connects the second frame section 352 to the third frame section 353, a seventh frame section 357, which connects the first frame section 351 to the fourth frame section 354, and an eighth frame section 358, which connects the second frame section 352 to the fourth frame section 354. The outer frame 35 further includes a first fixed section 381, which is connected to the third frame section 353 via the third shaft section 21, and a second fixed section 382, which is connected to the fourth frame section 354 via the fourth shaft section 22.

The first shaft section 11 protrudes from the first frame section 341 of the inner frame 34 in the direction +X and is connected to the first frame section 351 of the outer frame 35. The second shaft section 12 protrudes from the second frame section 342 of the inner frame 34 in the direction −X and is connected to the second frame section 352 of the outer frame 35. The third shaft section 21 protrudes from the third frame section 353 of the outer frame 35 in the direction −Y and is connected to the first fixed section 381, which has a plate-like shape and extends in the axis-X direction. The fourth shaft section 22 protrudes from the fourth frame section 354 of the outer frame 35 in the direction +Y and is connected to the second fixed section 382, which has a plate-like shape and extends in the axis-X direction. The first fixed section 381 is fixed to the fixed section 32 along an edge of the opening 320 that is the edge in the direction +Y, as shown in FIG. 3. The second fixed section 382 is fixed to the fixed section 32 along an edge of the opening 320 that is the edge in the direction −Y.

Cross-Sectional Shape of Shafts

The shaft section 10 has a shape symmetric with respect to the second swing axis J2, as shown in FIG. 4. That is, the first shaft section 11 and the second shaft section 12 are so shaped as to be symmetric with respect to the second swing axis J2. The shaft section 20 has a shape symmetric with respect to the first swing axis J1. That is, the third shaft section 21 and the fourth shaft section 22 are so shaped as to be symmetric with respect to the first swing axis J1.

Figure 5:
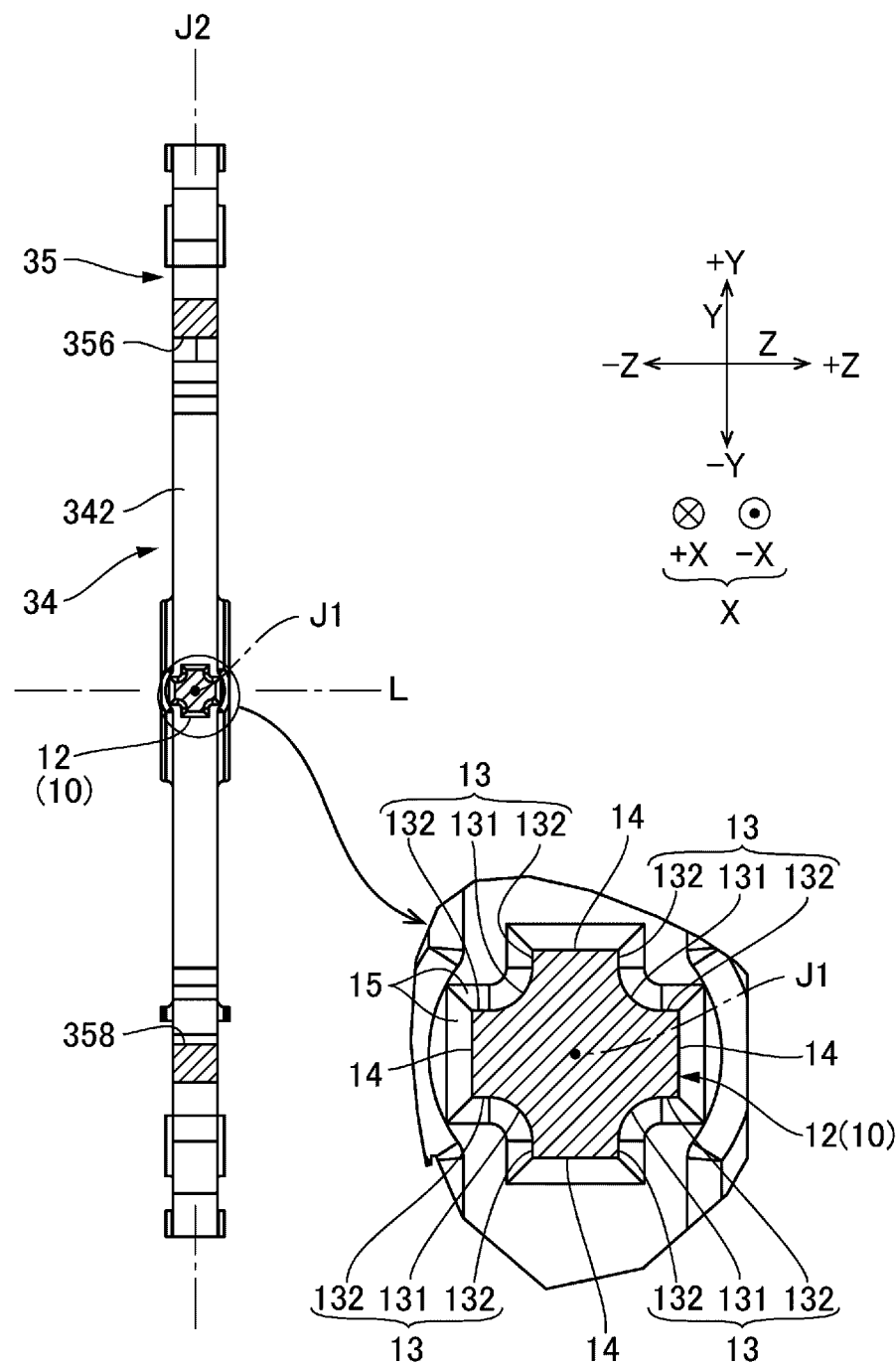
FIG. 5 is a cross-sectional view of one of the shaft sections and the outer frame and an enlarged view of the cross-sectional shape of the shaft section.

FIG. 5 is a cross-sectional view of the shaft section and the outer frame 35 and an enlarged view of the cross-sectional shape of the shaft section 10 or a cross-sectional view taken at the position A-A in FIG. 4 and a partially enlarged view of the cross section. The position A-A is the position of the second shaft section 12. Therefore, the enlarged view of FIG. 5 shows the cross-sectional shape of the shaft section 10 taken at the position of the second shaft section 12 and shows the cross-sectional shape of the shaft section 10 viewed in the direction along the first swing axis J1. In the present embodiment, the first shaft section 11 and the second shaft section 12 have the same cross-sectional shape viewed in the direction along the first swing axis J1. That is, assuming that the cross-sectional shape of the first shaft section 11 viewed in the direction along the first swing axis J1 is a first cross-sectional shape, and that the cross-sectional shape of the second shaft section 12 viewed in the direction along the first swing axis J1 is a second cross-sectional shape, the first cross-sectional shape and the second cross-sectional shape are the same cross-sectional shape.

Figure 6:
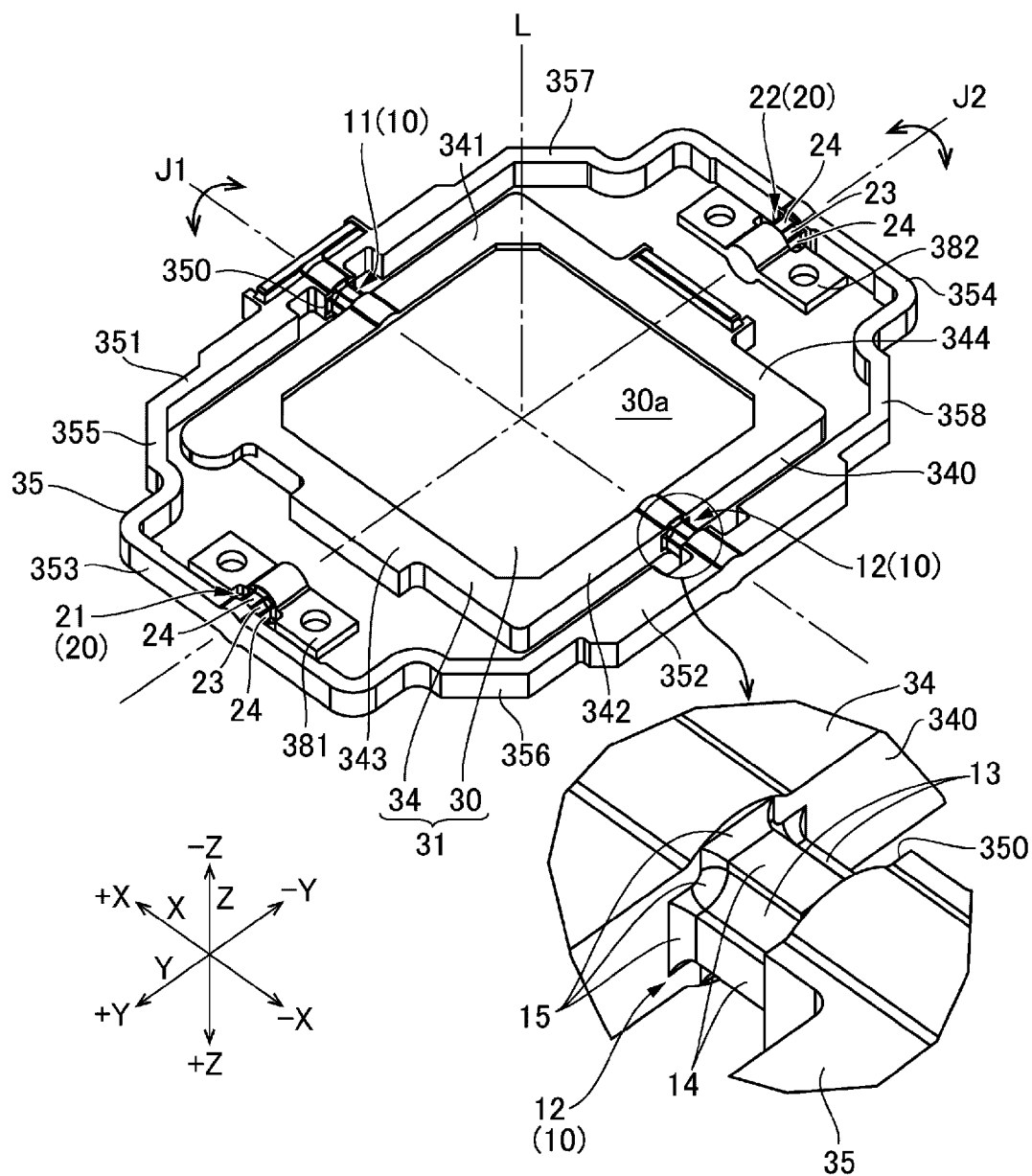
FIG. 6 is a perspective view of the movable section, the shaft sections, and the outer frame and an enlarged perspective view of one of the shaft sections.

FIG. 6 is a perspective view of the movable section 31, the shaft sections 10 and 20, and the outer frame 35 and an enlarged perspective view of the shaft section 10. The cross-sectional shape of the shaft section 10 viewed in the direction along the first swing axis J1 is a shape having a plurality of recesses 13 recessed inward, as shown in FIG. 5. The bottom of each of the recesses 13 has a curved shape. In more detail, the recesses 13 each include an arcuately curved section 131 and linear sections 132, which are connected to circumferentially opposite sides of the curved section 131. The linear section 132 provided on one circumferential side of the curved section 131 and the linear section 132 provided on the other circumferential side of the curved section 131 extend in directions perpendicular to each other.

The cross-sectional shape of the shaft section 10 is rotationally symmetric around the first swing axis J1, and the plurality of recesses 13 are arranged at equal intervals in the circumferential direction. Protrusions 14, which protrude toward the outer circumference of the cross-sectional shape, are disposed between the recesses 13 adjacent to each other in the circumferential direction. The cross-sectional shape of the shaft section 10 is so configured that the protrusions 14, which protrude toward the outer circumference of the cross-sectional shape, and the recesses 13, which are recessed inward, are alternately arranged in the circumferential direction.

In more detail, the cross-sectional shape of the shaft section 10 is a cross-like shape and has four recesses 13 having the same shape. The protrusions 14 protrude in two directions, toward one side and the other side of the first direction perpendicular to the first swing axis J1, and in other two directions, toward one side and the other side of the second direction perpendicular to the first swing axis J1 and to the first direction. In the present embodiment, the first direction is the axis-Y direction, and the second direction is the axis-Z direction. The protrusions 14 therefore protrude in four directions, the directions +Y and −Y and the directions +Z and −Z. The front end surface of each of the protrusions 14 that protrude in the directions +Y and −Y extends in the axis-Z direction. The front end surface of each of the protrusions 14 that protrude in the directions +Z and −Z extends in the axis-Y direction. The front end surface of each of the protrusions 14 is connected substantially at right angles to the inner circumferential surfaces of the corresponding ones of the recesses 13.

The cross-sectional shape of the shaft section 20, which connects the fixed section 32 to the outer frame 35, has the same cross-sectional shape as that of the shaft section 10, which connects the movable section 31 to the outer frame 35, as shown in FIGS. 3 and 6. That is, the cross-sectional shape of the shaft section 20 contains a plurality of recesses 23 recessed inward. The bottom of each of the recesses 23 has a curved shape. The cross-sectional shape of the shaft section 20 is rotationally symmetric around the second swing axis J2, and the plurality of recesses 23 are arranged at equal intervals in the circumferential direction. Protrusions 24, which protrude toward the outer circumference of the cross-sectional shape, are disposed between the recesses 23 adjacent to each other in the circumferential direction. In more detail, the cross-sectional shape of the shaft section 20 is a cross-like shape and has four recesses 23 and four protrusions 24. The protrusions 24 protrude in four directions, the directions +X and −X and the directions +Z and −Z.

Shape of Connection Section

One-side ends of the shaft section 10 are connected to outer circumferential end surfaces 340 of the inner frame 34, as shown in FIG. 6. Connection sections that connect the shaft section 10 to the outer circumferential end surfaces 340 each have a curved shape. The other-side ends of the shaft section 10 are connected to inner circumferential end surfaces 350 of the outer frame 35, and connection sections that connect the shaft section 10 to the inner circumferential end surfaces 350 each have a curved shape, as the connection sections that connect the shaft section 10 to the outer circumferential end surfaces 340 do.

The second shaft section 12 protrudes in the direction −X from the corresponding outer circumferential end surface 340 of the inner frame 34, and four side surfaces of the second shaft section 12 that are side surfaces in the directions +Y, −Y, +Z, and −Z each include a curved section 15 connected to the outer circumferential end surface 340. Connection sections that connect the recesses 13, which are provided in the second shaft section 12, to the outer circumferential end surface 340 each similarly include a curved section 15. A connection section that connects the first shaft section 11 to the corresponding outer circumferential end surface 340 has the same shape as that of a connection section that connects the second shaft section 12 shown in FIG. 6 to the corresponding outer circumferential end surface 340 and includes the curved sections 15. The connection section that connects the first shaft section 11 to the corresponding inner circumferential end surface 350 of the outer frame 350 and the connection section that connects the second shaft section 12 to the corresponding inner circumferential end surface 350 of the outer frame 350 each include the curved sections 15.

One-side ends of the shaft section 20 are connected to inner circumferential end surfaces 350 of the outer frame 35, as shown in FIGS. 4 and 6. Connection sections that connect one-side ends of the shaft section 20 to inner circumferential end surfaces 350 each have the same shape as that of the connection section that connects the second shaft section 12 shown in FIG. 6 to the corresponding outer circumferential end surface 340, and the connection sections each include the curved section 15. That is, the connection section that connects the third shaft section 21 to the corresponding inner circumferential end surface 350 and the connection section that connects the fourth shaft section 22 to the corresponding inner circumferential end surface 350 each include the curved sections 15. A connection section that connects the third shaft section 21 to the first fixed section 381 and a connection section that connects the fourth shaft section 22 to the second fixed section 382 each include the curved sections 15.

Primary Effects and Advantages of Present Embodiment

As described above, the projector 1 according to the present embodiment includes the light outputting apparatus 2, which outputs the video light LL, the projection system 4, which enlarges and projects the video light LL, and the optical device 3, which is disposed between the light outputting apparatus 2 and the projection system 4. The optical device 3 includes the movable section 31, which includes the glass plate 30 (optical section) having the light incident surface 30a, on which the video light LL is incident, the shaft section 10, which swingably supports the movable section 31 around the first swing axis J1, and the actuator 33, which causes the movable section 31 to swing. The cross-sectional shape of the shaft section 10 viewed in the direction along the first swing axis J1 is the shape having the plurality of recesses 13 recessed inward.

As described above, the configuration in which the cross-sectional shape of the shaft section 10 has the recesses 13 recessed inward allows reduction in stress concentration in the shaft section 10. In related art, the cross-sectional shape of a shaft section that swingably supports a movable section is a simple shape, such as a rectangular shape, and the simple shape, which has a small number of protrusions present on the outer circumferential surface of the shaft section, causes stress concentration at the small number of protrusions. Since the shaft section 10 in the present embodiment includes the plurality of recesses 13 recessed inward, the number of protrusions present at the outer circumferential surface of the shaft section 10 is greater than the number of protrusions present in a simple cross-sectional shape, such as a rectangular shape. For example, the shaft section 10 in the present embodiment includes the four recesses 13, and the edges of each of the recesses 13 each form a corner. The number of protrusions (corners) is therefore doubled as compared with the number of corners of a rectangular cross-sectional shape. As a result, a shape that can reduce the stress concentration in the shaft section 10 is achieved. Reduction in the stress concentration allows suppression of maximum stress in the shaft section 10, whereby durability against repetitive stress can be improved without an increase in rigidity of the shaft section 10. Instead, torque produced by the actuator 33 and necessary for inclination of the movable section 31 by a necessary angular amplitude can be suppressed with the necessary durability ensured. The configurations of the shaft section 10 and the actuator 33 can therefore be optimized.

The cross-sectional shape of the recesses 13 recessed inward allows reduction in shift of the position of the center of torsional motion produced when the movable section 31 swings so that the shaft section 10 is twisted, whereby the amount of flection of the shaft section 10 decreases. The positional precision of the movable section 31 that vibrates can therefore be improved, whereby the pixel shift can be precisely performed. The quality of the video images can therefore be improved.

In the present embodiment, the bottom of each of the recesses 13 has a curved shape. The shape described above allows an increase in the number of protrusions for dispersion of locations where stress concentration occur and further allows suppression of a decrease in rigidity of the shaft section 10. The durability against repetitive stress can therefore be improved.

In the present embodiment, the cross-sectional shape of the shaft section 10 is rotationally symmetric around the first swing axis J1. The shape described above allows uniform dispersion of the locations where stress concentration occurs, whereby the stress concentration is readily reduced.

In the present embodiment, the cross-sectional shape of the shaft section 10 is so configured that the protrusions 14, which protrude toward the outer circumference of the cross-sectional shape, and the recesses 13 are alternately arranged in the circumferential direction. The protrusions 14 protrude toward one side (in direction +Y) and the other side (in direction −Y) of the first direction (axis-Y direction) perpendicular to the first swing axis J1 and toward one side (in direction +Z) and the other side (in direction −Z) of the second direction (axis-Z direction) perpendicular to the first swing axis J1 and to the first direction (axis-Y direction). The cross-sectional shape described above allows the ratio of the dimensions of the protrusions 14 and the recesses 13 between the first direction and the second direction to be readily adjusted. The cross-sectional shape of the shaft section 10 is therefore readily adjusted in accordance with a stress induction situation.

The optical device 3 according to the present embodiment includes the fixed section 32, which supports the movable section 31 via the shaft section 10. As described above, the configuration in which the fixed section 32 is one of the constituent parts of the optical device 3 allows the movable section 31 and the fixed section 32 to be connected to each other via the shaft section 10 into a unit. The optical device 3 is therefore be readily installed.

The optical device 3 according to the present embodiment includes the movable section 31, which includes the glass plate 30 (optical section) having the light incident surface 30*a*, on which the video light LL is incident, the first shaft section 11 and the second shaft section 12, which swingably support the movable section 31 around the first swing axis J1, and the actuator 33, which causes the movable section 31 to swing, and the shaft section 10, which swingably supports the movable section 31, is formed of the first shaft section and the second shaft section 12. Assuming that the cross-sectional shape of the first shaft section 11 viewed in the direction along the first swing axis J1 is the first cross-sectional shape, and that the cross-sectional shape of the second shaft section 12 viewed in the direction along the first swing axis J1 is the second cross-sectional shape, the first cross-sectional shape and the second cross-sectional shape are the same cross-sectional shape and each have the plurality of recesses 13 recessed inward. The stress concentration can therefore be reduced in each of the first shaft section 11 and the second shaft section 12. The configurations of the shaft section 10 and the actuator 33 can therefore be optimized. Further, the amount of flection of each of the first shaft section 11 and the second shaft section 12 can be reduced. The positional precision of the movable section 31 that vibrates can therefore be improved.

The optical device 3 according to the present embodiment can cause the movable section 31 to swing around two axes perpendicular to each other for pixel shift in the two directions. That is, the optical device 3 includes the movable section 31, which includes the glass plate 30 (optical section) having the light incident surface 30*a*, on which the video light LL is incident, the shaft section 10 (first shaft section 11 an second shaft section 12), which swingably supports the movable section 31 around the first swing axis J1, the shaft section 20 (third shaft section 21 an fourth shaft section 22), which swingably supports the movable section 31 around the second swing axis J2, the fixed section 32, which supports the movable section 31 via the first shaft section 11, the second shaft section 12, the third shaft section 21, and the fourth shaft section 22, the first actuator 36, which causes the movable section 31 to swing around the second swing axis J2, and the second actuator 37, which causes the movable section 31 to swing around the first swing axis J1. Assuming that the cross-sectional shape of the first shaft section 11 viewed in the direction along the first swing axis J1 is the first cross-sectional shape, the cross-sectional shape of the second shaft section 12 viewed in the direction along the first swing axis J1 is the second cross-sectional shape, the cross-sectional shape of the third shaft section 21 viewed in the direction along the second swing axis J2 is the third cross-sectional shape, and the cross-sectional shape of the fourth shaft section 22 viewed in the direction along the second swing axis J2 is the fourth cross-sectional shape, the first, second, third, and fourth cross-sectional shapes each have the plurality of recesses 13 recessed inward. As described above, when the four shaft sections each have the recesses 13, the stress concentration in each of the four shaft sections can be reduced, whereby the amount of flection of the shaft section can be reduced. The configurations of the first shaft section 11, the second shaft section 12, and the first actuator 36 and the configurations of the third shaft section 21, the fourth shaft section 22, and the second actuator 37 can therefore be optimized. Further, the amounts of flection of the shaft sections 10 and 20 can be reduced, whereby the positional precision of the movable section 31 that vibrates in the two directions can be improved.

Figure 7:
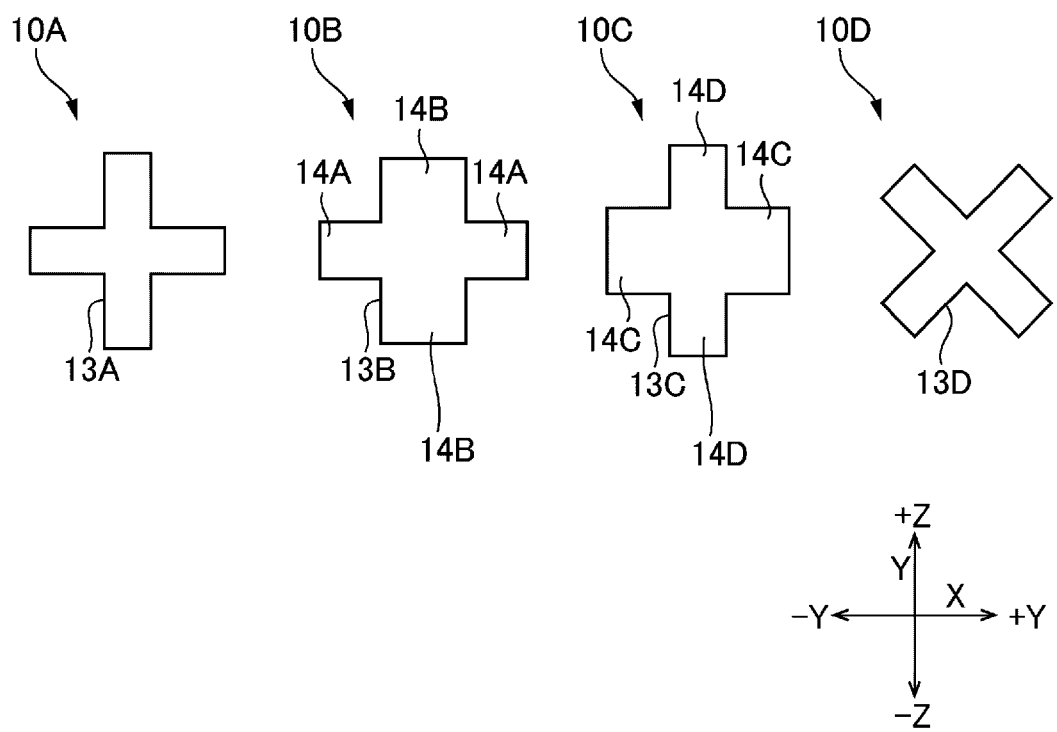
FIG. 7 is a descriptive diagram showing the cross-sectional shape of each shaft section in a variation.

Variations (1) FIG. 7 is a descriptive diagram showing the cross-sectional shapes of shaft sections 10A, 10B, 10C, and 10D in a variation. The shaft section 10A includes a plurality of recesses 13A recessed inward. The shaft section 10B includes a plurality of recesses 13B recessed inward. The shaft section 10C includes a plurality of recesses 13C recessed inward. The shaft section 10D includes a plurality of recesses 13D recessed inward. The shaft section 10 in the embodiment described above is so configured that the bottom of each of the recesses 13 has a curved shape, and the recesses 13A, 13B, 13C, and 13D shown in FIG. 7 each have corners. Even when the bottom of each of the recesses does not have a curved shape but have a shape having a corner as described above, the stress concentration can be reduced, and the amount of flection can be reduced. The configuration of the actuator 33 can therefore be optimized, as in the embodiment described above. Further, the positional precision of the movable section 31 that vibrates can be improved.

In the variation shown in FIG. 7, the cross-sectional shape of each of the shaft sections 10B and 10C is linearly symmetric. The shaft section 10B is so configured that first protrusions 14A, which protrude in the directions +Y and −Y differ from, second protrusions 14B, which protrude in the directions +Z and −Z, in terms of circumferential width. Similarly, the shaft section 10C is so configured that first protrusions 14C, which protrude in the directions +Y and −Y differ from, second protrusions 14D, which protrude in the directions +Z and −Z, in terms of circumferential width. As described above, arbitrarily changing the aspect ratio of any of the protrusions allows a shape according to the stress induction situation.

(2) In the embodiment described above, the shaft section 10 includes four recesses 13, and the number of recesses 13 is not limited to four. For example, the number of recesses 13 may instead be two or three or five or more. The recesses 13 may or may not be arranged at equal intervals in the circumferential direction. The recesses 13 may not all have the same shape. For example, recesses having two different shapes may be alternately be arranged in the circumferential direction.

(3) Assuming that the cross-sectional shape of the first shaft section 11 viewed in the direction along the first swing axis J1 is the first cross-sectional shape, and that the cross-sectional shape of the second shaft section 12 viewed in the direction along the first swing axis J1 is the second cross-sectional shape, the first cross-sectional shape and the second cross-sectional shape are the same cross-sectional shape in the embodiment described above, but the first cross-sectional shape and the second cross-sectional shape may differ from each other. Further, assuming that the cross-sectional shape of the third shaft section 21 viewed in the direction along the second swing axis J2 is the third cross-sectional shape, and that the cross-sectional shape of the fourth shaft section 22 viewed in the direction along the second swing axis J2 is the fourth cross-sectional shape, the third cross-sectional shape and the fourth cross-sectional shape are the same cross-sectional shape in the embodiment described above, but the third cross-sectional shape and the fourth cross-sectional shape may differ from each other.

For example, in the embodiment described above, out of the third shaft section 21 and the fourth shaft section 22 disposed along the second swing shaft J2, the fourth shaft section 22 is disposed on the side where the second actuator 37 is disposed. The magnet 371 and the magnet holding plate 373 of the second actuator 37 are fixed to the fourth frame 344, to which the fourth shaft section 22 is connected. On the other hand, no magnet is fixed to the third frame 343, to which the third shaft section 21 is connected. Therefore, when the movable section 31 swings around the second swing axis J2, torsional stress induced in the third shaft section 21 differs from that induced in the fourth shaft section 22 because a load acting on the third shaft section 21 differs from a load acting on the fourth shaft section 22. The third cross-sectional shape and the fourth cross-sectional shape can therefore be different from each other in accordance with the stress induction situation.

Similarly, in the embodiment described above, out of the first shaft section 11 and the second shaft section 12 disposed along the first swing shaft J1, the first shaft section 12 is disposed on the side where the first actuator 36 is disposed. The magnet 361 and the magnet holding plate 363 of the second actuator 36 are fixed to the first frame 351, to which the first shaft section 11 is connected. On the other hand, no magnet is fixed to the second frame 352, to which the second shaft section 12 is connected. Therefore, when the movable section 31 swings around the first swing axis J1, torsional stress induced in the first shaft section 11 differs from that induced in the second shaft section 12. The first cross-sectional shape and the second cross-sectional shape can therefore be different from each other in accordance with the stress induction situation.

(4) The optical device 3 in the embodiment described above causes the movable section 31 to swing around two axes perpendicular to each other for pixel shift in the two directions, and the present disclosure is applicable to an optical device that performs pixel shift in one direction. For example, in an optical device that swingably supports a movable section by using a shaft section disposed on a swing axis extending in a diagonal direction of the movable section, the cross-sectional shape of the shaft section can be a shape having recesses recessed inward. Therefore, in an optical device that performs one-direction pixel shift in which the positions of pixels displayed on a screen are shifted not in the direction in which the pixels are arranged but in the diagonal direction, stress concentration in the shaft section can be reduced, and the configurations of the shaft section and the actuator can be optimized. Further, the positional precision of the movable section that vibrates can be improved.

Aspects Derived from Embodiment and Variations

An aspect of the optical device described above includes a movable section including an optical section having a light incident surface, a shaft section that swingably supports the movable section around a first swing axis, and a first actuator that causes the movable section to swing. The cross-sectional shape of the shaft section viewed in the direction along the swing axis is a shape having a plurality of recesses recessed inward.

In the aspect of the optical device described above, the cross-sectional shape of the shaft section may be rotationally symmetric around the first swing axis.

In the aspect of the optical device described above, the cross-sectional shape of the shaft section may be a shape in which protrusions protruding toward the outer circumference of the cross-sectional shape and the recesses are alternately arranged in the circumferential direction.

In the aspect of the optical device described above, the bottom of each of the recesses may have a curved shape.

In the aspect of the optical device described above, the recesses may each have a corner.

In the aspect of the optical device described above, the protrusions of the cross-sectional shape of the shaft section may protrude toward one side and the other side of a first direction perpendicular to the first swing axis and toward one side and the other side of a second direction perpendicular to the first swing axis and to the first direction.

In the aspect of the optical device described above, the shaft section that supports the movable section includes a first shaft section and a second shaft section that sandwich the movable section and support the movable section around the first swing axis. The first shaft section has a first cross-sectional shape viewed in the direction along the first swing axis. The second shaft section has a second cross-sectional shape viewed in the direction along the first swing axis. The first cross-sectional shape and the second cross-sectional shape may be the same shape.

The aspect of the optical device described above may include a fixed section that supports the movable section via the shaft section that supports the movable section.

The aspect of the optical device described above further includes an outer frame that surrounds the movable section, an other shaft section that supports the outer frame around a second swing axis perpendicular to the first swing axis, and a second actuator that causes the outer frame to swing. The movable section is connected to the outer frame via the shaft that supports the movable section. The outer frame is connected to the fixed section via the other shaft section that supports the outer frame. The cross-sectional shape of the other shaft section that supports the outer frame viewed in the direction along the second swing axis is a shape having a plurality of recesses recessed inward.

In the aspect of the optical device described above, the cross-sectional shape of the other shaft section that supports the outer frame may be rotationally symmetric around the second swing axis.

In the aspect of the optical device described above, the cross-sectional shape of the other shaft section may be a shape in which protrusions protruding toward the outer circumference of the cross-sectional shape and the recesses are alternately arranged in the circumferential direction.

In the aspect of the optical device described above, the protrusions of the cross-sectional shape of the other shaft section may protrude toward one side and the other side of the first direction perpendicular to the second swing axis and toward one side and the other side of the second direction perpendicular to the second swing axis and to the first direction.

In the aspect of the optical device described above, the other shaft section that supports the outer frame includes a third shaft section and a fourth shaft section that sandwich the outer frame and support the outer frame around the second swing axis. The third shaft section has a third cross-sectional shape viewed in the direction along the second swing axis. The fourth shaft section has a fourth cross-sectional shape viewed in the direction along the second swing axis. The third cross-sectional shape and the fourth cross-sectional shape may be the same shape.

Another aspect of the optical device described above includes a movable section including an optical section having a light incident surface, a first shaft section and a second shaft section that swingably support the movable section around a swing axis, and an actuator that causes the movable section to swing. The cross-sectional shape of the first shaft section viewed in the direction along the swing axis is assumed to be a first cross-sectional shape. The cross-sectional shape of the second shaft section viewed in the direction along the swing axis is assumed to be a second cross-sectional shape. The first cross-sectional shape differs from the second cross-sectional shape. The first cross-sectional shape and the second cross-sectional shape are each a shape having a plurality of recesses recessed inward.

An aspect of the projector described above includes a light outputting apparatus that outputs video light, a projection system that enlarges and projects the video light, and the optical device described above disposed between the light outputting apparatus and the projection system.

What is claimed is:

1. An optical device comprising:
   a movable section including an optical section having a light incident surface;
   a shaft section that swingably supports the movable section around a first swing axis; and
   a first actuator that causes the movable section to swing,
   wherein a cross-sectional shape of the shaft section viewed in a direction along the swing axis is a shape having a plurality of recesses recessed inward.

2. The optical device according to claim 1, wherein the cross-sectional shape is rotationally symmetric around the first swing axis.

3. The optical device according to claim 1, wherein the cross-sectional shape is a shape in which protrusions protruding toward an outer circumference of the cross-sectional shape and the recesses are alternately arranged in a circumferential direction.

4. The optical device according to claim 3, wherein a bottom of each of the recesses has a curved shape.

5. The optical device according to claim 3, wherein the recesses each have a corner.

6. The optical device according to claim 3, wherein the protrusions of the cross-sectional shape protrude toward one side and another side of a first direction perpendicular to the first swing axis and toward one side and another side of a second direction perpendicular to the first swing axis and to the first direction.

7. The optical device according to claim 1,
   wherein the shaft section that supports the movable section includes a first shaft section and a second shaft section that sandwich the movable section and support the movable section around the first swing axis,
   the first shaft section has a first cross-sectional shape viewed in a direction along the first swing axis,
   the second shaft section has a second cross-sectional shape viewed in the direction along the first swing axis, and
   the first cross-sectional shape and the second cross-sectional shape are the same shape.

8. The optical device according to claim 1, further comprising a fixed section that supports the movable section via the shaft section that supports the movable section.

9. The optical device according to claim 1,
   further comprising an outer frame that surrounds the movable section;
   an other shaft section that supports the outer frame around a second swing axis perpendicular to the first swing axis; and
   a second actuator that causes the outer frame to swing,
   wherein the movable section is coupled to the outer frame via the shaft that supports the movable section,
   the outer frame is coupled to the fixed section via the other shaft section that supports the outer frame, and
   a cross-sectional shape of the other shaft section that supports the outer frame viewed in a direction along the second swing axis is a shape having a plurality of recesses recessed inward.

10. The optical device according to claim 9, wherein the cross-sectional shape of the other shaft section that supports the outer frame is rotationally symmetric around the second swing axis.

11. The optical device according to claim 9, wherein the cross-sectional shape of the other shaft section is a shape in which protrusions protruding toward an outer circumference of the cross-sectional shape and the recesses are alternately arranged in a circumferential direction.

12. The optical device according to claim 11, wherein the protrusions of the cross-sectional shape of the other shaft section protrude toward one side and another side of a first direction perpendicular to the second swing axis and toward one side and another side of a second direction perpendicular to the second swing axis and to the first direction.

13. The optical device according to claim 9,
wherein the other shaft section that supports the outer frame includes a third shaft section and a fourth shaft section that sandwich the outer frame and support the outer frame around the second swing axis,
the third shaft section has a third cross-sectional shape viewed in a direction along the second swing axis,
the fourth shaft section has a fourth cross-sectional shape viewed in the direction along the second swing axis, and
the third cross-sectional shape and the fourth cross-sectional shape are the same shape.

14. An optical device comprising:
a movable section including an optical section having a light incident surface;
a first shaft section and a second shaft section that swingably support the movable section around a swing axis; and
an actuator that causes the movable section to swing,
wherein when a cross-sectional shape of the first shaft section viewed in a direction along the swing axis is a first cross-sectional shape, and
a cross-sectional shape of the second shaft section viewed in the direction along the swing axis is a second cross-sectional shape,
the first cross-sectional shape differs from the second cross-sectional shape, and
the first cross-sectional shape and the second cross-sectional shape are each a shape having a plurality of recesses recessed inward.

15. A projector comprising:
a light outputting apparatus that outputs video light;
a projection system that enlarges and projects the video light; and
the optical device according to claim 1 disposed between the light outputting apparatus and the projection system.

* * * * *